US009785412B1

(12) United States Patent
Huynh Van et al.

(10) Patent No.: US 9,785,412 B1
(45) Date of Patent: Oct. 10, 2017

(54) METHODS AND SYSTEMS FOR OBJECT-ORIENTED MODELING OF NETWORKS

(71) Applicant: GLUE NETWORKS, INC., Sacramento, CA (US)

(72) Inventors: Olivier Huynh Van, Sacramento, CA (US); Jacob Enoch Locken, Newcastle, CA (US); John Alfred Anderson, Citrus Heights, CA (US); Daniel Roy Bolar, Citrus Heights, CA (US); Lee Kevin Frost, Roseville, CA (US)

(73) Assignee: GLUE NETWORKS, INC., Sacramento, CA (US)

(*) Notice: Subject to any disclaimer, the term of this patent is extended or adjusted under 35 U.S.C. 154(b) by 0 days.

(21) Appl. No.: 15/056,776

(22) Filed: Feb. 29, 2016

Related U.S. Application Data

(60) Provisional application No. 62/126,245, filed on Feb. 27, 2015, provisional application No. 62/137,064, filed on Mar. 23, 2015.

(51) Int. Cl.
*G06F 9/44* (2006.01)
*H04L 29/08* (2006.01)

(52) U.S. Cl.
CPC ............... *G06F 8/24* (2013.01); *H04L 67/02* (2013.01)

(58) Field of Classification Search
CPC ............... G06F 8/24; G06F 8/35; H04L 67/02
(Continued)

(56) References Cited

U.S. PATENT DOCUMENTS 5,594,792 A  1/1997  Chouraki et al.
6,061,721 A * 5/2000  Ismael ................ G06F 9/54
                                                    709/218
(Continued)

FOREIGN PATENT DOCUMENTS

CN   102315971   1/2012
JP   2000-209239  7/2000
(Continued)

OTHER PUBLICATIONS

OpenDaylight: Towards a Model-Driven SDN Controller Architecture—Jan Medved,Anton Tkacik,Robert Varga,Ken Gray—Cisco Systems San Jose, CA, USA—World of Wireless, Mobile and Multimedia Networks (WoWMoM), 2014 IEEE 15th International Symposium—Date of Conference: Jun. 19-19, 2014—Date Added to IEEE Xplore: Oct. 9, 2014.*

(Continued)

*Primary Examiner* — Francisco Aponte
(74) *Attorney, Agent, or Firm* — DLA Piper LLP US

(57) ABSTRACT

At least one development module in communication with at least one processor and at least one memory may assemble at least one network model comprising at least one of a plurality of classes, the assembling being performed using object oriented modeling, each class comprising at least one property defining at least one network concept for at least one network device. At least one control module in communication with the at least one processor and the at least one memory may generate the at least one network concept from the at least one network model. At least one orchestration module in communication with the at least one processor and the at least one memory may transmit the at least one network concept to the at least one network device corresponding to the at least one class in the at least one network model.

30 Claims, 19 Drawing Sheets

(58) Field of Classification Search
USPC .......................................................... 717/105
See application file for complete search history.

(56) References Cited

U.S. PATENT DOCUMENTS

| | | | |
|---|---|---|---|
| 6,105,131 A | 8/2000 | Carroll | |
| 6,175,917 B1 | 1/2001 | Arrow | |
| 6,286,038 B1 | 9/2001 | Reichmeyer et al. | |
| 6,335,926 B1 | 1/2002 | Silton | |
| 6,363,421 B2* | 3/2002 | Barker | H04L 41/0213 |
| | | | 709/202 |
| 6,438,690 B1 | 8/2002 | Patel et al. | |
| 6,513,159 B1 | 1/2003 | Dodson | |
| 6,571,285 B1* | 5/2003 | Groath | H04L 12/2602 |
| | | | 370/352 |
| 6,640,251 B1 | 10/2003 | Wiget et al. | |
| 6,715,073 B1 | 3/2004 | An et al. | |
| 6,826,611 B1 | 11/2004 | Arndt | |
| 6,879,679 B1 | 4/2005 | Ong | |
| 6,892,300 B2 | 5/2005 | Carroll et al. | |
| 6,907,572 B2* | 6/2005 | Little | G06F 9/45512 |
| | | | 715/762 |
| 6,931,526 B1 | 8/2005 | Bacha et al. | |
| 6,966,060 B1 | 11/2005 | Young et al. | |
| 7,054,924 B1 | 5/2006 | Harvey et al. | |
| 7,075,933 B2 | 7/2006 | Aysan | |
| 7,305,479 B1 | 12/2007 | Morris et al. | |
| 7,352,853 B1 | 4/2008 | Shen et al. | |
| 7,373,661 B2 | 5/2008 | Smith et al. | |
| 7,376,653 B2 | 5/2008 | Hart | |
| 7,397,911 B2 | 7/2008 | Shen et al. | |
| 7,409,709 B2 | 8/2008 | Smith et al. | |
| 7,411,955 B2 | 8/2008 | Li et al. | |
| 7,420,933 B2 | 9/2008 | Booth, III et al. | |
| 7,447,901 B1 | 11/2008 | Sullenberger | |
| 7,535,856 B2 | 5/2009 | Booth, III et al. | |
| 7,558,847 B2* | 7/2009 | Strassner | H04L 41/0813 |
| | | | 709/203 |
| 7,593,352 B2 | 9/2009 | Verma | |
| 7,600,011 B1 | 10/2009 | Urbanek | |
| 7,602,737 B2 | 10/2009 | Asati et al. | |
| 7,636,771 B2 | 12/2009 | Torii | |
| 7,643,434 B2 | 1/2010 | Mandavilli et al. | |
| 7,660,265 B2 | 2/2010 | Kreuk | |
| 7,801,030 B1 | 9/2010 | Aggarwal et al. | |
| 7,869,436 B1 | 1/2011 | Adler et al. | |
| 7,940,916 B2 | 5/2011 | Baker et al. | |
| 8,010,650 B2* | 8/2011 | Strassner | H04L 41/0813 |
| | | | 709/203 |
| 8,041,786 B2 | 10/2011 | Tindal et al. | |
| 8,055,891 B2 | 11/2011 | Haustein et al. | |
| 8,140,642 B1 | 3/2012 | Kadam et al. | |
| 8,195,827 B2* | 6/2012 | Strassner | H04L 41/0813 |
| | | | 709/203 |
| 8,370,933 B1 | 2/2013 | Buckler | |
| 8,693,371 B2* | 4/2014 | Duggan | H04L 41/12 |
| | | | 370/254 |
| 8,701,078 B1* | 4/2014 | Holler | G06F 8/35 |
| | | | 715/273 |
| 8,782,182 B2 | 7/2014 | Chaturvedi et al. | |
| 8,819,202 B1 | 8/2014 | Carolan et al. | |
| 8,849,973 B2 | 9/2014 | Leib et al. | |
| 8,869,236 B1 | 10/2014 | Tonogai et al. | |
| 9,037,969 B2 | 5/2015 | Wolff-Petersen et al. | |
| 9,038,151 B1* | 5/2015 | Chua | H04L 45/02 |
| | | | 709/223 |
| 9,178,807 B1* | 11/2015 | Chua | H04L 45/02 |
| 9,264,301 B1* | 2/2016 | Chua | H04L 45/02 |
| 9,276,877 B1* | 3/2016 | Chua | H04L 45/02 |
| 9,407,541 B2* | 8/2016 | Barabash | H04L 45/42 |
| 9,450,817 B1* | 9/2016 | Bahadur | H04L 41/0806 |
| 2001/0053991 A1* | 12/2001 | Bonabeau | G06Q 10/0639 |
| | | | 705/7.17 |
| 2002/0112048 A1 | 8/2002 | Gruyer et al. | |
| 2002/0184388 A1 | 12/2002 | Yaseen et al. | |
| 2002/0186664 A1 | 12/2002 | Gibson | |
| 2002/0188643 A1* | 12/2002 | Kennedy | H04L 63/102 |
| | | | 718/1 |
| 2002/0191548 A1 | 12/2002 | Ylonen | |
| 2003/0076837 A1 | 4/2003 | Whitehill et al. | |
| 2003/0135508 A1 | 7/2003 | Chorafakis | |
| 2003/0169730 A1 | 9/2003 | Narasimhan et al. | |
| 2004/0028212 A1 | 2/2004 | Lok et al. | |
| 2004/0059831 A1 | 3/2004 | Chu et al. | |
| 2004/0078373 A1 | 4/2004 | Ghoneimy et al. | |
| 2004/0083379 A1 | 4/2004 | Neuman et al. | |
| 2004/0136394 A1 | 7/2004 | Onno et al. | |
| 2004/0187127 A1 | 9/2004 | Gondi et al. | |
| 2004/0261116 A1 | 12/2004 | Mckeown et al. | |
| 2005/0022208 A1* | 1/2005 | Bolar | H04L 41/0233 |
| | | | 719/315 |
| 2005/0050186 A1* | 3/2005 | Chen | H04L 29/06 |
| | | | 709/223 |
| 2005/0138634 A1 | 6/2005 | Luty et al. | |
| 2005/0198221 A1 | 9/2005 | Manchester et al. | |
| 2005/0256732 A1 | 11/2005 | Bauer et al. | |
| 2006/0050862 A1 | 3/2006 | Shen et al. | |
| 2006/0074732 A1 | 4/2006 | Shukla et al. | |
| 2006/0080425 A1 | 4/2006 | Wood et al. | |
| 2006/0112182 A1 | 5/2006 | Chen et al. | |
| 2006/0180709 A1 | 8/2006 | Breton et al. | |
| 2006/0184998 A1 | 8/2006 | Smith | |
| 2006/0187854 A1 | 8/2006 | Booth, III et al. | |
| 2006/0187855 A1 | 8/2006 | Booth, III et al. | |
| 2006/0187856 A1 | 8/2006 | Booth, III et al. | |
| 2006/0187937 A1 | 8/2006 | Townsley et al. | |
| 2006/0190570 A1 | 8/2006 | Booth, III et al. | |
| 2006/0206702 A1 | 9/2006 | Fausak | |
| 2006/0248139 A1 | 11/2006 | Sundar | |
| 2006/0259963 A1 | 11/2006 | Maxwell | |
| 2006/0268829 A1 | 11/2006 | Nedeltchev | |
| 2007/0011126 A1 | 1/2007 | Conner et al. | |
| 2007/0115990 A1 | 5/2007 | Asati et al. | |
| 2007/0130192 A1 | 6/2007 | Bolder et al. | |
| 2007/0136788 A1* | 6/2007 | Monahan | H04L 63/20 |
| | | | 726/3 |
| 2007/0165540 A1 | 7/2007 | Elias et al. | |
| 2007/0206597 A1 | 9/2007 | Asati et al. | |
| 2007/0253384 A1 | 11/2007 | Kanagala | |
| 2007/0260575 A1 | 11/2007 | Robinson et al. | |
| 2007/0271451 A1 | 11/2007 | Fluhrer | |
| 2008/0037656 A1 | 2/2008 | Hannuksela | |
| 2008/0052758 A1 | 2/2008 | Byrnes | |
| 2008/0062997 A1 | 3/2008 | Nix | |
| 2008/0075090 A1 | 3/2008 | Farricker | |
| 2008/0117902 A1 | 5/2008 | Vinneras | |
| 2008/0172440 A1* | 7/2008 | Jagannathan | H04L 67/2804 |
| | | | 709/201 |
| 2008/0177868 A1 | 7/2008 | Zibershtein et al. | |
| 2008/0189757 A1 | 8/2008 | Schackow et al. | |
| 2008/0232379 A1 | 9/2008 | Mohamed | |
| 2008/0281953 A1 | 11/2008 | Blaisdell | |
| 2008/0298367 A1 | 12/2008 | Furukawa | |
| 2009/0044253 A1 | 2/2009 | Interlandi et al. | |
| 2009/0046729 A1 | 2/2009 | Nagata | |
| 2009/0059814 A1 | 3/2009 | Nixon et al. | |
| 2009/0067440 A1 | 3/2009 | Chadda et al. | |
| 2009/0073995 A1 | 3/2009 | Pandey et al. | |
| 2009/0097417 A1 | 4/2009 | Asati et al. | |
| 2009/0161679 A1 | 6/2009 | Yang | |
| 2009/0249293 A1* | 10/2009 | Davies | G06F 8/24 |
| | | | 717/116 |
| 2009/0254639 A1 | 10/2009 | Manchester | |
| 2009/0282129 A9 | 11/2009 | Tindal | |
| 2009/0304003 A1 | 12/2009 | Huynh Van | |
| 2009/0304004 A1 | 12/2009 | Huynh Van et al. | |
| 2009/0327869 A1 | 12/2009 | Fan et al. | |
| 2010/0042725 A1 | 2/2010 | Jeon et al. | |
| 2010/0054245 A1 | 3/2010 | Asati | |
| 2010/0142410 A1 | 6/2010 | Huynh Van et al. | |
| 2010/0180016 A1 | 7/2010 | Bugwadia | |
| 2010/0226280 A1 | 9/2010 | Burns et al. | |
| 2010/0226372 A1 | 9/2010 | Watanabe | |

(56) References Cited

U.S. PATENT DOCUMENTS

| | | | |
|---|---|---|---|
| 2010/0241698 A1* | 9/2010 | Hillerbrand | H04L 12/24 709/203 |
| 2011/0013641 A1 | 1/2011 | Kolhi et al. | |
| 2011/0176531 A1 | 7/2011 | Rune et al. | |
| 2011/0276636 A1* | 11/2011 | Cheng | H04L 69/14 709/206 |
| 2011/0286384 A1 | 11/2011 | Sugimoto et al. | |
| 2011/0289261 A1 | 11/2011 | Candelaria | |
| 2012/0046058 A1 | 2/2012 | Vesterinen et al. | |
| 2012/0057463 A1 | 3/2012 | Hurtta | |
| 2012/0084423 A1 | 4/2012 | McGleenon | |
| 2012/0089700 A1 | 4/2012 | Safruti et al. | |
| 2012/0218993 A1 | 8/2012 | Masaki | |
| 2012/0250516 A1 | 10/2012 | Aggarwal et al. | |
| 2012/0265324 A1* | 10/2012 | Colombo | G05B 19/4188 700/29 |
| 2013/0060929 A1 | 3/2013 | Koponen et al. | |
| 2013/0085914 A1 | 4/2013 | McPherson | |
| 2013/0117427 A1 | 5/2013 | Amano et al. | |
| 2013/0223442 A1* | 8/2013 | Narayanan | H04L 45/64 370/389 |
| 2013/0279336 A1 | 10/2013 | Woelker | |
| 2014/0052877 A1* | 2/2014 | Mao | H04L 61/103 709/245 |
| 2014/0143419 A1* | 5/2014 | Vyatkin | H02J 3/46 709/224 |
| 2014/0169158 A1* | 6/2014 | Mishra | H04L 69/04 370/228 |
| 2014/0223530 A1 | 8/2014 | Nedeltchev et al. | |
| 2014/0282628 A1* | 9/2014 | Pruss | G06F 9/541 719/328 |
| 2014/0371941 A1* | 12/2014 | Keller | H02J 13/0006 700/297 |
| 2014/0372617 A1* | 12/2014 | Houyou | H04L 41/145 709/226 |
| 2015/0023210 A1* | 1/2015 | Kis | H04L 45/563 370/254 |
| 2015/0058412 A1* | 2/2015 | Hillerbrand | H04L 12/24 709/203 |
| 2015/0169345 A1* | 6/2015 | DeCusatis | G06F 9/45545 718/1 |
| 2015/0172195 A1* | 6/2015 | DeCusatis | H04L 47/10 370/231 |
| 2015/0188772 A1* | 7/2015 | Gasparakis | H04L 43/08 709/224 |
| 2015/0229709 A1* | 8/2015 | Pruss | G06F 9/541 709/201 |
| 2015/0347175 A1* | 12/2015 | DeCusatis | G06F 9/45545 718/1 |
| 2015/0381410 A1* | 12/2015 | Strassner | G06N 5/048 709/220 |
| 2016/0036636 A1* | 2/2016 | Erickson | H04L 41/0816 370/248 |
| 2016/0057207 A1* | 2/2016 | Li | H04N 21/4431 709/203 |
| 2016/0112246 A1* | 4/2016 | Singh | H04L 41/0853 370/254 |
| 2016/0112269 A1* | 4/2016 | Singh | H04L 41/0853 709/224 |
| 2016/0127181 A1* | 5/2016 | Li | H04L 41/0806 370/254 |
| 2016/0142243 A1 | 5/2016 | Karam et al. | |
| 2016/0255051 A1* | 9/2016 | Williams | H04L 63/0236 |
| 2016/0381124 A1* | 12/2016 | Hwang | H04L 41/5054 709/226 |

FOREIGN PATENT DOCUMENTS

| | | |
|---|---|---|
| JP | 2011-199623 | 10/2011 |
| WO | WO-2004/090672 | 10/2004 |
| WO | WO-2013/093702 | 6/2013 |
| WO | WO-2013/177311 | 11/2013 |

OTHER PUBLICATIONS

Glue Networks Deployment Guide for the Cisco Next-Generation WAN—© 2013 Cisco Systems, Inc—Last Updated: May 1, 2013. http://www.cisco.com/c/en/us/td/docs/solutions/Enterprise/WAN_and_MAN/GlueNtwksDepGuide.html.*

View from the Cloud; Cloud-Based Software Crowdsourcing: Wei-Tek Tsai • Arizona State University; Wenjun Wu • Beihang University; Michael N. Huhns • University of South Carolina—2014 IEEE; IEEE Internet Computing.*

Design patterns for open tool integration; Gabor Karsai, Andras Lang, Sandeep Neema; Institute for Software-Integrated Systems, Vanderbilt University—Softw Syst Model (2005) 4: 157-170 / Digital Object Identifier (DOI) 10.1007/s10270-004-0073-y.*

The Waterfall Model in Large-Scale Development—Kai Petersen, Claes Wohlin and Dejan Baca—F. Bomarius et al. (Eds.): PROFES 2009, LNBIP 32, pp. 386-400, Springer-Verlag Berlin Heidelberg 2009.*

International Search Report issued in International Application No. PCT/US2009/045155, dated Jul. 6, 2009.

Written Opinion issued in International Application No. PCT/US2009/045155, dated Jul. 6, 2009.

International Search Report issued in International Application No. PCT/US2009/045159, dated Aug. 24, 2009.

Written Opinion issued in International Application No. PCT/US2009/045159, dated Aug. 24, 2009.

International Search Report issued in International Application No. PCT/US2009/045159, dated Sep. 24, 2009.

Written Opinion issued in International Application No. PCT/US2009/045159, dated Sep. 24, 2009.

B. Weis, "Group Domain of Interpretation (GDOI) Support for RSVP", MSEC Working Group, Internet-Draft, Jun. 21, 2007 [retrieved Aug. 15, 2009], http://www.watersprings.com/pub/id/draft-weis-gdoi-for-rsvp-00.txt.

International Search Report issued in International Application No. PCT/US2009/067384, dated Jul. 20, 2010.

Written Opinion issued in International Application No. PCT/US2009/067384, dated Jul. 20, 2010.

"OSGI Alliance", printed from http://www.osgi.org, on Sep. 26, 2014 (2 pages).

"Equinox Framework QuickStart Guide" printed from http://www.eclipse.org/equinox/documents/quickstart-framework.php, on Sep. 26, 2014 (5 pages).

"Human Machine Interface (HMI)" http.//en.wikipedia.org/wiki/Human-machine_interface, on Sep. 26, 2014, Last updated Sep. 20, 2014 (2 pages).

Cisco, "Cisco IOS IP Routing: BFD Configuration Guide", Release 15.1, 2010, Cisco System, Inc. retrieved from http://www.cisco.com/c/en/us/td/docs/ios/iproute_bfd/configuration/guide/15_1/irb_15_1_book.pdf, 110 pages.

Oscar Mejia, "How to Create a Command Line Program with NodeJS", Aug. 5, 2012, retrieved from https://web.archive.org/web/20130314232203/http://oscar-mejia.com/blog.how-to-create-a-command-line-program-with-nodejs/ (8 pages).

George Ornbo, "Command Line Utilities with Node.js", Jan. 2, 2014, retrieved from http://shapeshed.com/commandlineutilitieswithnodejs/ (4 pages).

"Command Line JavaScript", Oct. 15, 2012, retrieved from http://web.archive.org/web/20121015021129/ http://javascript.cs.lmu.edu.notes.commandlinejs (8 pages).

File History of U.S. Appl. No. 12/634,536.

File History of U.S. Appl. No. 12/471,179.

File History of U.S. Appl. No. 12/471,199.

File History of U.S. Appl. No. 13/830,801.

English language abstract of CN-102315971 published Jan. 11, 2012.

English language abstract of JP-2000-209239 published Jul. 28, 2000.

English language abstract of JP-2011-199623 published Oct. 6, 2011.

File History of U.S. Appl. No. 14/017,696.

File History of U.S. Appl. No. 14/997,119.

(56) References Cited

OTHER PUBLICATIONS

File History of U.S. Appl. No. 15/078,267.
File History of U.S. Appl. No. 14/219,685.
File History of U.S. Appl. No. 14/219,654.
File History of U.S. Appl. No. 14/325,757.
File History of U.S. Appl. No. 14/490,424.
File History of U.S. Appl. No. 15/666,033.
File History of U.S. Appl. No. 13/830,737.
File History of U.S. Appl. No. 15/667,253.

* cited by examiner

Fig.13

```
    Using OS default !!!
    Creating ClassMap Namespace in System Store
    Namespace ClassMap is using Naming Convention /qos-cmap.*/ for "Qos" Feature for Node qos-node
    Creating PolicyMap Namespace in System Store
    Namespace PolicyMap is using Naming Convention /qos-pmap.*/ for "Qos" Feature for Node qos-node
    Creating IpAcl Namespace in System Store
    Namespace IpAcl is using Naming Convention /qos-acl.*/ for "Qos" Feature for Node qos-node
>> Qos Discovery
    >> Discover class-maps
        Loading nib sys/jnib/cli/cisco/ClassMap.cli.jnib
        Running show: sh run all | sec class-map
        Validate ClassMap named qos-cmap-test for feature Qos
        GenericCliMgr Matching Objects for ClassMap: {"ClassMap":{"class-map match-any qos-cmap-test":{"match
ip dscp af43":"","match ip dscp af11":"","match ip dscp af12":""}}}
    << Discover class-maps
<< Qos Discovery
>> Process Qos Template
    >> Process Class Map Template
        Dscp af43 is Added to ClassMap qos-cmap-test (match)
        Dscp af11 is Added to ClassMap qos-cmap-test (match)
        Dscp af12 is Added to ClassMap qos-cmap-test (match)
        Creating ClassMap Namespace in Object Store
        Object qos-cmap-test[ClassMap] has been Added to Object Store (ClassMap) for Node
        ClassMap qos-cmap-test matches the Naming Convention for "Qos" Feature
    << Process Class Map Template
<< Process Qos Template
>> Render Qos       1302           1301
    >> Update Qos Class Maps /            /
        Retrieving Feature Object qos-cmap-test
        Retrieved 1 [__ClassMap] Objects for Feature Qos.
        Loading nib sys/jnib/cli/cisco/ClassMap.cli.jnib
        Resolved Model: {"$lc1:class-map":{"$lc1:match-any":"","$lc2:qos-cmap-
test":"","$lc3:<cr>":{"$lc1:description ?":"<cr>","$lc2:match ip dscp af43":"<cr>","$lc3:match ip dscp
af11":"<cr>","$lc4:match ip dscp af12":"<cr>"}}}
        Compare toCli = {"class-map match-any qos-cmap-test":{"match ip dscp af43":"","match ip dscp
af11":"","match ip dscp af12":""}}
        Compare fromCli = {"class-map match-any qos-cmap-test":{"match ip dscp af43":"","match ip dscp
af11":"","match ip dscp af12":""}}
        Comparing class-map match-any qos-cmap-test
        Updating CLI Commands: {}
    << Update Qos Class Maps
    >> Remove Qos Class Maps
        Retrieving Feature Object qos-cmap-test
        Retrieved 1 [__ClassMap] Objects for Feature Qos.
        Loading nib sys/jnib/cli/cisco/ClassMap.cli.jnib
        Resolved Model: {"$lc1:class-map":{"$lc1:match-any":"","$lc2:qos-cmap-
test":"","$lc3:<cr>":{"$lc1:description ?":"<cr>","$lc2:match ip dscp af43":"<cr>","$lc3:match ip dscp
af11":"<cr>","$lc4:match ip dscp af12":"<cr>"}}}
        Compare toCli = {"class-map match-any qos-cmap-test":{"match ip dscp af43":"","match ip dscp
af11":"","match ip dscp af12":""}}
        Compare fromCli = {"class-map match-any qos-cmap-test":{"match ip dscp af43":"","match ip dscp
af11":"","match ip dscp af12":""}}
        Comparing class-map match-any qos-cmap-test
        Remove CLI Commands: {}
    << Remove Qos Class Maps
<< Render Qos finishObj: {
  "finishObj" : true,
  "runJNIBMeta" : {
    "runTimeInSecs" : 5.52
  }
}
```

Fig.14

```
{
  "@Info" : {
    "description" : "(Internal) The Routing feature handles the static and dynamic
routing configuration of the target node.",
    "featureDependencies" : {
      "jnib" : {                    1401
        "/sys/jnib/features/routing/routing.feature.jnib" : {}
      },                            1402
      "preRequiredFeatures" : {
        "/sys/type/construct/feature/connectivity.jtype" : {},
        "/sys/type/construct/feature/ipNumbering.jtype" : {}
      }
    },                              1403
    "domainDependencies" : {
      "/sys/type/construct/domain/connectivity.jtype" : {
        "optional" : true
      },
      "/sys/type/construct/domain/overlayNetwork.jtype" : {
        "optional" : true
      },
      "/sys/type/construct/domain/network.jtype" : {
        "optional" : true
      },
      "/sys/type/construct/domain/site.jtype" : {
        "optional" : true
      }
    },                              1404
    "nodeDependencies" : {
      "/sys/type/construct/node/router.jtype" : {}
    }
  }
}
```

Fig. 15a

```
classDefinition: {
    "ios": {
        "isakmp" : {
            "name@JS.readOnly" : true,
            "name" : "barr",
            "version" : "1",
            "age" : 0,
            "enabled" : true,
            "color@Enum" : ["blue", "green", "red"]
        },
        "ikev2" : {
            "name" : "foo",
            "version" : "2",
            "age@JS.readOnly" : true,
            "age" : 0,
            "enabled@JS.readOnly" : true,
            "enabled" : true,
            "color@Enum" : ["blue", "green", "red"],
            "level1" : {
                "name" : ""
            },
//          "list1@JS.method.add.condition" : "this.version === '2'",
/*
            "list1@JS.method.add.condition" : function (val) {
                if (this.version === "2") {
                    return true;
                }
            },
*/
//          "list1@JS.method.add.logFailedCondition" : "'This value didn\\'t work for: '+this.version+', '+value",
//          "list1@JS.method.add.logSuccess" : function(val) {return "This value: "+val+", worked for: "+this.name},
            "list1@JS.classes" : ["TestNDKType1"],
            "list1" : [],
            "obj1@JS.classes" : [TestNDKType2, "boo" ],
            //"obj1@JS.objectMap" : true,
            "obj1" : {},
            "address" : "",
            "@JS.validate.condition" : "true",
//          "@JS.validate.condition" : function() { return true;},
//          "@JS.validate.logFailedCondition" : "'It didnt work man..'+this.version"
            "@JS.validate.logFailedCondition" : function() {return "wow this validation is invalid"}
        }
    }
}, nibLoaded : function() { global.TestNDKType1 = function __TestNDKType1(name) {
        NDKClass.call(this, thisNib.__thisType.__classDefinition.ikev2);
        this.name = name;
    } global.TestNDKType1.prototype.bar = function() {
        log.info("this is a bar.");
    }
}
```

Fig. 15a (Cont)

```
run : function() { var myTestType2 = new TestNDKType2("thisIsANewType");

var myTest = new TestNDKType1("Test");

if (myTest instanceof TestNDKType1) {
        log.info("This is a TestNDKType1");
    } myTest.bar();

var myTest2 = new TestNDKType1("theName");
    log.info(" NDKClass.getTypeMethodNames(): "+NDKClass.getTypeMethodNames());
    log.info(" myTest2.getSyntheticMethodNames(): "+myTest2.getSyntheticMethodNames());
    log.info(" myTest2 getName(): "+myTest2.getName());
    log.info(" myTest2 getVersion(): "+myTest2.getVersion());
    log.info(" myTest2 getVersion(): "+myTest2.getVersion());
    log.info(" myTest2 getNamespace(): "+myTest2.getNamespace());
    log.info(" myTest2 toString(): "+myTest2.toString());
    log.info(" myTest2 special NDKClass.getNamespace() access:
"+myTest2.NDKClass.getNamespace());
    myTest2.addList1(myTest, myTest);
    myTest2.removeList1(myTest);
    myTest2.setLevel1Name("Fantastic");
    myTest2.validate();
    myTest2.linkObj1(myTestType2);
    log.info(" myTest2 getLevel1Name(): "+myTest2.getLevel1Name());
    myTest2.logDebugSyntheticMethods();
    log.info(" myTest2: "+JSON.stringify(myTest2));

var myTest3 = new TestNDKType2("Hello");
    log.info(" myTest3 toString(): "+myTest3.toString());

```
This is a TestNDKType1
    this is a bar.
    NDKClass.getTypeMethodNames():
set,unset,get,enable,disable,link,unlink,add,remove,getItem
    myTest2.getSyntheticMethodNames():
getAge,getEnabled,setColor,unsetColor,getColor,setLevel1Name,unsetLevel1Name,getLevel1Nam
e,addList1,removeList1,getList1Item,linkObj1,unlinkObj1,getObj1,setAddress,unsetAddress,g
etAddress
    myTest2 getName(): theName
    myTest2 getVersion(): 2
    myTest2 getVersion(): 2
    myTest2 getNamespace(): TestNDKType1
    myTest2 toString(): theName<TestNDKType1>
    myTest2 special NDKClass.getNamespace() access: TestNDKType1
    Test<TestNDKType1> is added to: this.list1 for theName<TestNDKType1>
    Test<TestNDKType1> is added to: this.list1 for theName<TestNDKType1>
    Test<TestNDKType1> is removed from: this.list1 for theName<TestNDKType1>
    Fantastic is set on: this.level1.name for theName<TestNDKType1>
    thisIsANewType<TestNDKType2> is linked to: this.obj1 for theName<TestNDKType1>
    myTest2 getLevel1Name(): Fantastic
>> Synthentic Methods for: theName<TestNDKType1>
    getAge() <-- this.age <number>
    getEnabled() <-- this.enabled <boolean>
    setColor() --> this.color <Enum>
    unsetColor() --> this.color <Enum>
    getColor() <-- this.color <Enum>
    setLevel1Name() --> this.level1.name <string>
    unsetLevel1Name() --> this.level1.name <string>
    getLevel1Name() <-- this.level1.name <string>
    addList1() --> this.list1 <Array>, classes: [TestNDKType1]
    removeList1() --> this.list1 <Array>, classes: [TestNDKType1]
    getList1Item() <-- this.list1 <Array>, classes: [TestNDKType1]
    linkObj1() --> this.obj1 <object>, classes: [TestNDKType2,boo]
    unlinkObj1() --> this.obj1 <object>, classes: [TestNDKType2,boo]
    getObj1() <-- this.obj1 <object>, classes: [TestNDKType2,boo]
    setAddress() --> this.address <string>
    unsetAddress() --> this.address <string>
    getAddress() <-- this.address <string>
<< Synthentic Methods for: theName<TestNDKType1>
    myTest2:
{"name":"theName","version":"2","age":0,"enabled":true,"color":null,"level1":{"name":"Fan
tastic"},"list1":[null,{"name":"Test","version":"2","age":0,"enabled":true,"color":null,"
level1":{"name":""},"list1":[],"obj1":{},"address":""}],"obj1":{"name":"thisIsANewType","
version":"1","age":0,"enabled":true,"color":null},"address":""}
    myTest3 toString(): Hello<TestNDKType2> finishObj: {
  "finishObj" : true,
  "runJNIBMeta" : {
    "engineVersion" : "5.17.8",
    "javaVersion" : "1.8.0_60",
    "runTimeInSecs" : 0.89
  }
}
```

… # METHODS AND SYSTEMS FOR OBJECT-ORIENTED MODELING OF NETWORKS

CROSS-REFERENCE TO RELATED APPLICATION

This application claims priority from U.S. Provisional Application No. 62/126,245, entitled "Methods and Systems for Object-Oriented Modeling Using an Orchestration Engine," filed Feb. 27, 2015, and U.S. Provisional Application No. 62/137,064, entitled "Methods and Systems for Object-Oriented Modeling of Networks," filed Mar. 23, 2015, the entireties of which are incorporated by reference herein.

This application also incorporates the following applications, publications, and patents by reference in their entirety: U.S. Pat. No. 8,837,491; U.S. Patent Application Publication No. 2009/0304003; U.S. Patent Application Publication No. 2010/0142410; U.S. Patent Application Publication No. 2015/0010008; U.S. patent application Ser. No. 13/830,737; U.S. patent application Ser. No. 13/830,801; U.S. patent application Ser. No. 14/017,696; U.S. patent application Ser. No. 14/219,654; U.S. patent application Ser. No. 14/219,685; U.S. patent application Ser. No. 14/490,424; and U.S. patent application Ser. No. 14/997,119.

BRIEF DESCRIPTION OF THE DRAWINGS

FIG. 11 is an integrated development environment (IDE) interface according to an embodiment of the invention.

FIG. 14 is an example feature dependency according to an embodiment of the invention.

FIG. 15A is an example of how to use a dynamic network development kit (NDK) according to an embodiment of the invention.

FIG. 15B is an example of the dynamic NDK being used for a class definition shown in FIG. 15A according to an embodiment of the invention.

DETAILED DESCRIPTION OF SEVERAL EMBODIMENTS

Figure 1:
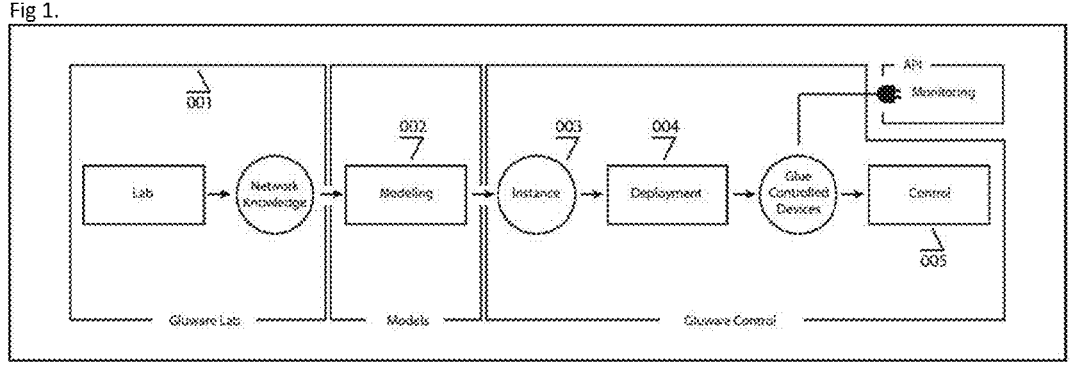
FIG. 1 is a process of modeling, data validation, packaging, test lab validation, and deployment according to an embodiment of the invention.

Many engineering processes may be consumed by manually, repetitious processes which may utilize a team of highly skilled IT or network engineers to work (e.g., onsite and/or offsite) for many hours in coordination with other engineers (e.g., at the same site, at other sites). Systems and methods described herein may be used for automated orchestration of complex, context-dependent tasks and processes previously performed by network engineers.

In some embodiments, a network orchestration engine may decouple virtual and/or physical networking device commands and control functions from complex provisioning, configuring, re-provisioning, re-configuring, de-provisioning, rolling-forward, rolling-backward and controlling closed-loop processing. Object oriented modeling can be performed for network constructs, command and control, rules, procedures, dependencies, or order of operations or any combination thereof. The orchestration may enable highly rapid provisioning, configuration of command and control of complex single and/or complex federated network, in part or in whole, with nested layers of specific ordered dependencies, rules, and special cases, including multivendor environments. Thus, new networking devices, virtual networking devices, policies, configurations, access controls, and other IT networking constructs and configurations, may be easily instantiated, orchestrated and rapidly deployed, provisioned, repeated, and rolled-back in case of failure or policy changes.

In some embodiments, the orchestration engine may be interposed between, for example: visual object oriented programming, object oriented network modeling, rules processing, packaging tools, object interfaced and/or encapsulated network devices (e.g., physical and/or virtual), or federations of IT networks, or any combination thereof.

In some embodiments, tiered-level, multi-vendor rules and dependency-based needs of entities may be served. For example, engineering teams complex tasks (e.g., for today or the future), may be orchestrated in an intelligent system that may be programmable, reusable, measurable, and indicative of actions that may be taken for optimal utilization, agility, and performance. In some embodiments, method and systems are provided that free up significant engineering and operating expenses.

In some embodiments, network orchestration may be provided by computers and/or processors executing computer program instructions. A computer may be any programmable machine or machines capable of performing arithmetic and/or logical operations. In some embodiments, computers may comprise processors, memories, data storage devices, and/or other commonly known or novel elements. These elements may be connected physically or through network or wireless links. Computers may also comprise software which may direct the operations of the aforementioned elements. Computers may be referred to with terms that are commonly used by those of ordinary skill in the relevant arts, such as servers, PCs, mobile devices, routers, switches, data centers, distributed computers, and other terms. Computers may facilitate communications between users and/or other computers, may provide databases, may perform analysis and/or transformation of data, and/or perform other functions. It will be understood by those of ordinary skill that those terms used herein may be interchangeable for some embodiments.

Computers may be linked to one another via a network or networks. A network may be any plurality of completely or partially interconnected computers wherein some or all of the computers are able to communicate with one another. It will be understood by those of ordinary skill that connections between computers may be wired in some cases (e.g., via Ethernet, coaxial, optical, or other wired connection) or may be wireless (e.g., via Wi-Fi, WiMax, 4G, or other wireless connections). Connections between computers may use any protocols, including connection-oriented protocols such as TCP or connectionless protocols such as UDP. Any connection through which at least two computers may exchange data can be the basis of a network.

Throughout the description, the following terms may be used:

Networking: Comprises a logical unit of some network configuration.

Concept: Includes quality of service (QoS), path control, overlay network, etc. May also be known as networking configurations and/or configurations.

Node: Comprises a representation of a physical and/or virtual device in a network, such as a router or a switch.

Configuration Settings: Comprises settings to be populated by the human administrator, including validation rules and/or smart defaults.

Configuration Data: Comprises values entered by the human administrator to be used for display or provisioning purposes. Configuration settings may have associated validation rules.

Networking Feature: Comprises describing how a networking concept is applied to a node. An example of a feature is QoS.

A feature may comprise at least two parts, configuration settings/data and the knowledge to apply a networking concept to a node.

In order to apply a networking concept to a node, a feature may use a sequence of instructions/business logic to take the configuration settings/data and turn them into a device's actual configuration (e.g., via CLI, device specific API and/or object model).

Networking Domain: Comprises describing common related configuration settings across a group of nodes. It may also describes the hierarchical relationship between domains. Each domain may have its own set of configuration settings that describes the common information shared by all the nodes in the domain. For example, a domain representing a physical location and environment could be a "site" that is described by the configuration settings, street address, local routing protocols, static routes, etc.

An example of a domain could be a path control domain where multiple devices are part of a specific path control domain. Another domain could be a customer where multiple devices belong to a customer. The relationship between the domains could be that a customer can have multiple path control domains. Because of this relationship, any nodes in a path control domain may be by definition part of that path control domain's customer.

Networking Global: There may be cases where configuration settings do not fit into a domain or a node, but still may be shared across multiple features. These types of settings may be referred to as networking globals. A network global configuration setting can be referenced by any feature.

Attached Storage: Comprises a configuration settings/data storage mechanism for feature developers to store data across features and feature executions. Storages can be attached to any domain or node.

Networking Policy: A policy comprises a grouping of multiple features into a single named unit. A policy may centrally manage a group of features across a group of devices.

JNIB: "Javascript Network Information Bit" comprises a scripting module that may be built with EMCA-262 (e.g., JavaScript), and the business logic used to apply networking concepts to a node.

JType: Comprises FLAW definition language for describing configuration settings, based on ECMA-404 (JSON), plus extensions and annotations.

JType Element: Comprises a single configuration setting variable defined within a JType.

Lab: Comprises the Integrated Development Environment (IDE) for creating network knowledge, for modeling networks (e.g., networking features, JNIBs, JTypes, etc.).

Control: Comprises the platform including the dashboards, portal, REST services, and other software components that make up a system. Control may consume the network knowledge and network models conceived in Lab.

Orchestration Engine: Comprises a process that utilizes network models and network knowledge to provision, configure, update, roll forward, rollback configurations and complex networking concepts to nodes (e.g., virtual and/or physical networking devices).

FIG. 1 is an orchestration process according to an embodiment of the invention. This process may include modeling, data validation, packaging, test lab validation, and deployment, including provisioning new networking devices (with verification), command and control and ongoing management and monitoring of configuration, state and other data points. FIG. 1 depicts five phases (e.g., modeling, programming, deployment, runtime, and monitoring) for orchestration. The orchestration engine may be interposed between the human interface and the object and data for automated configurations for object-oriented network modeling (002), using and replicating instances (003), programming in complex, multilayer intelligence including testing, validating, deploying (004), and controlling (005) virtual or physical IT network devices. For example, acting as an intermediary between any integrated development environment (IDE) (e.g., Gluware Lab™—former Gluware Lab, Eclipse™, Komodo™, IntelliJ™, XCode™) authored programming and validation, and any software development kit (SDK) (e.g., Gluware's object oriented network development kit, also known as Gluware NDK) for modeling, deployment, runtime, and federated IT network infrastructures, the orchestration engine may decouple, from a software design perspective, the provisioning of network devices, provisioning command and control functions that may otherwise be interfaced manually or with a basic single tier automation. Therefore, a new device, feature, hierarchical rule change, command and control of any specific device or class or device groupings or policies of classes of devices, may be individuated in the Gluware (or similar) authoring program's output.

Figure 2:
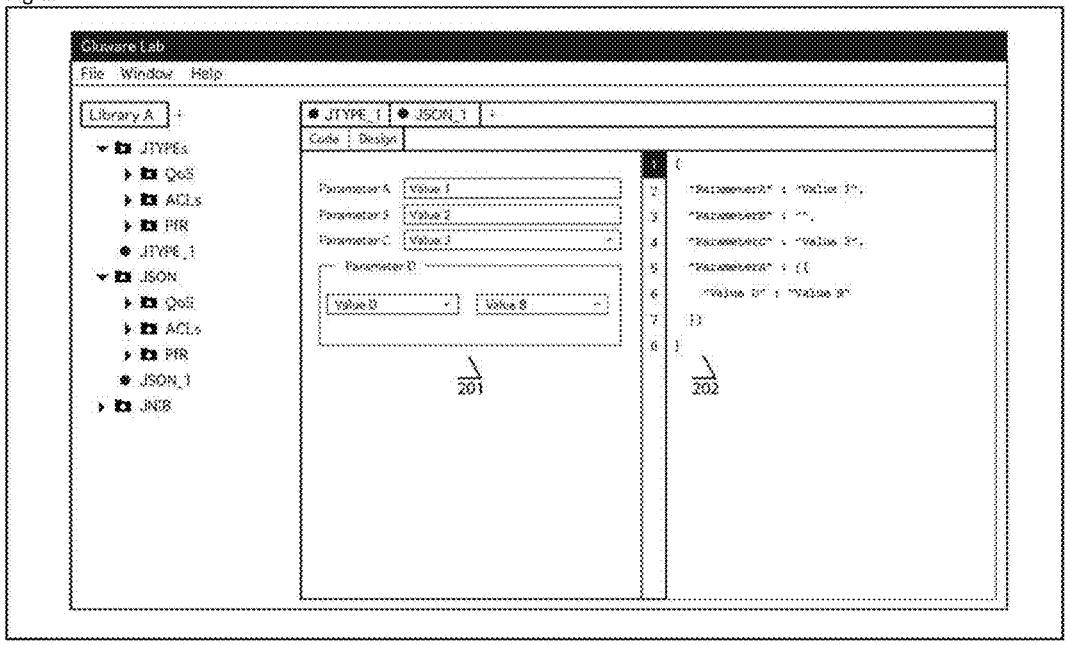
FIG. 2 is a lab interface according to an embodiment of the invention.

FIG. 2 depicts visual modeling, rules, programming, and packaging tools referred to in some embodiments as the lab or integrated development environment (IDE). A development module, processor, and/or environment may be used to perform the modeling. A development module may provide any suitable IDE or development environment to a user, for example. The user may define one or more network devices, program rules, dependencies, program configuration settings, and packaging tools, such as a purchasing process, for example. As described in greater detail below, the user may define a model using a modeling language (e.g., FLAW). The FLAW model may be defined and exercised by the user in a first pane (201), and the user may see how the model renders in a second pane (202), for example.

Figure 3:
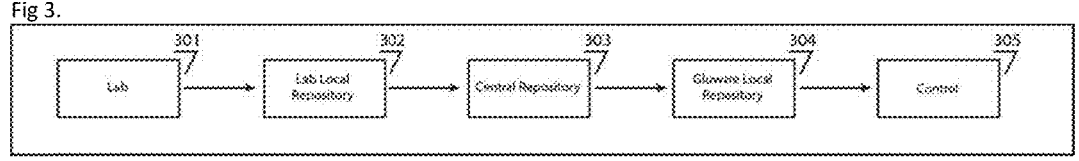
FIG. 3 is a node command/control information flow according to an embodiment of the invention.

FIG. 3 depicts, according to an embodiment of the invention, a local/non-local version controlled repository and information flow for command and control of nodes (e.g., network devices). Information generated in the lab (301) may be added to a local repository (302) within the device running the lab. The device may communicate such repository data to a central repository (303). The node to be controlled may communicate with the central repository to add the data to a local repository (304), and may thereafter be controlled (305) via the command and control data created in the lab.

Figure 4:
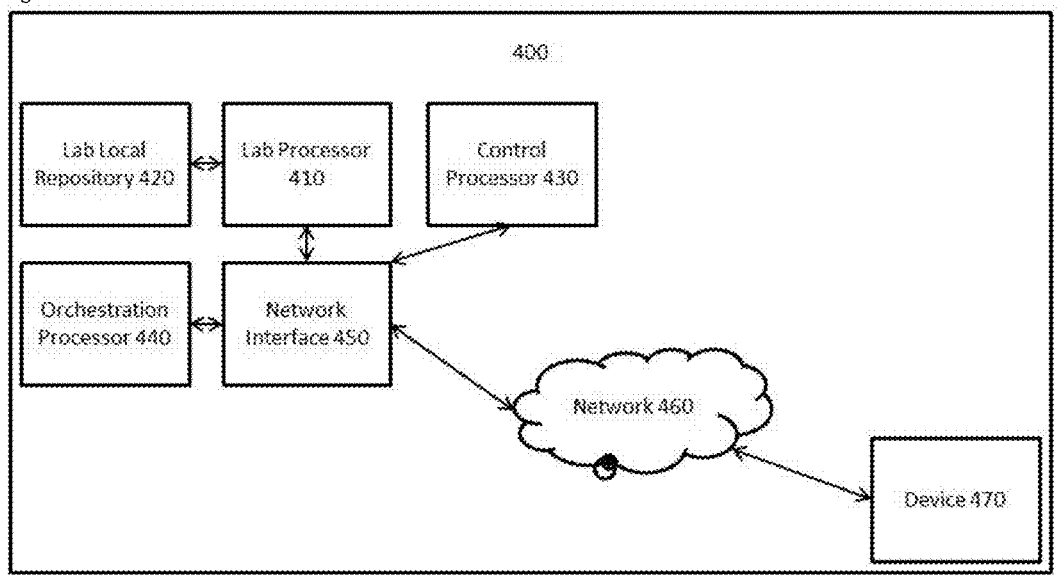
FIG. 4 is a modeling system according to an embodiment of the invention.

FIG. 4 is a modeling system (400) according to an embodiment of the invention. The system may implement the object oriented modeling described herein. Lab (or development) processor (410), control processor (430), and orchestration processor (440) may perform the lab, control, and orchestration functions, respectively, described herein. Lab (or development) repository (420) may store objects for use with the system as described herein. Processors may utilize network interface (450) to communicate, via network (460) with devices (470) to be controlled according to the modeling generated by the processors.

In some embodiments, the instances of workflow-processing for the orchestration may launch multiple instantiations and/or threads of orchestration engine processes that may execute their own workflow/orchestration. In addition to the orchestration engine processes, the (workflow-processing portion) of the orchestration engine may assign work to orchestration threaded processes and the Gluware Lab generated packages of devices models, rules, and configurations, may be accepted by the connection managers of the orchestration engine; whereas device specific protocol connectors (DSPC) may be loaded to run with the device specific protocol engine (DSPE) (e.g., similar to adapters, drivers, etc.) running in optimized locations, whereby the output, and two way conversations within the network devices may match the target device, be it, for example, character based, command line interface (CLI), document object model, RESTful API, programmatic object model and/or any other programmatic command and control interface that control the network's virtual or real devices within the federations of IT networks. The distributed and scalable architecture of the orchestration engine may be built on scalable, elastic cloud services that may enable any number of components (e.g., device specific protocol engines/device specific protocol connectors) to be running and executing orchestrations at any given time.

Monitoring and controlling network devices (e.g., nodes) may be done while the devices are running and connected to their specific instances of the DSPCs which may in turn be connected back to the orchestration engine via corresponding DSPCs, with the human command and control interface heretofore surfaced in a visual tool modeling, deployment, management and orchestration monitoring tools such as Gluware Lab.

Figure 5:
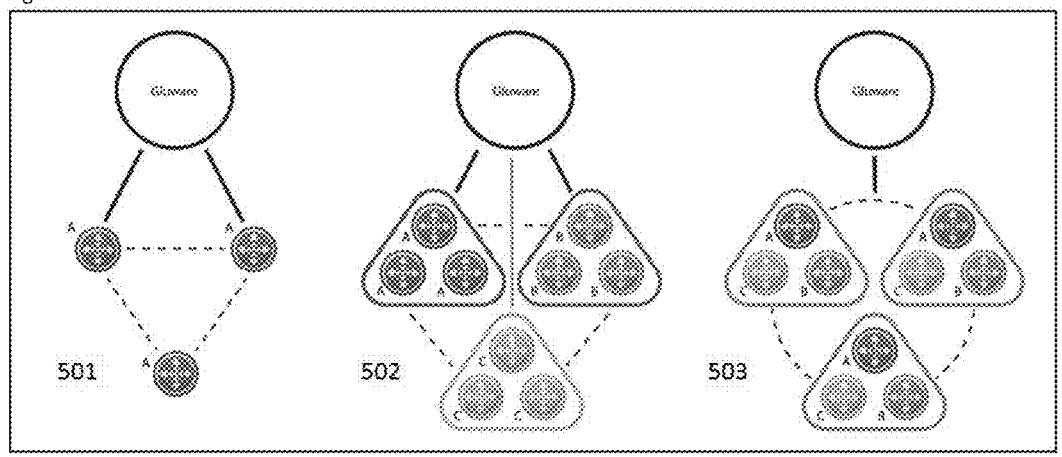
FIG. 5 is a multi-vendor network according to an embodiment of the invention.
Figure 6:
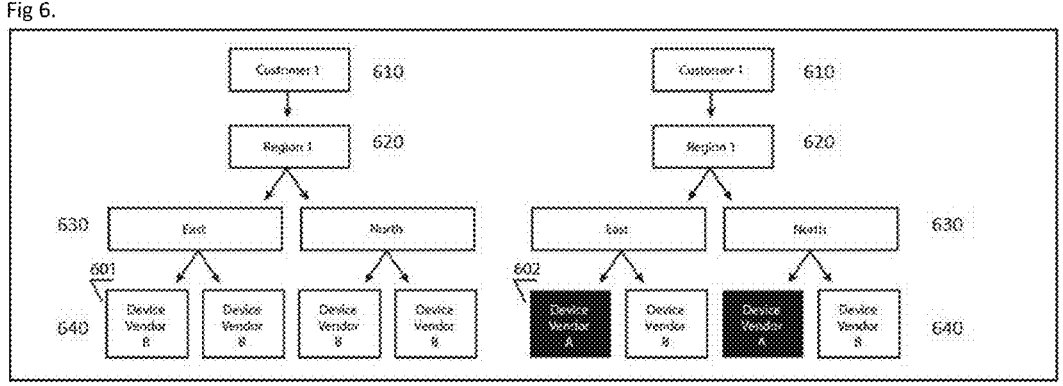
FIG. 6 is a process of swapping networking devices from one vendor to another according to an embodiment of the invention.

FIG. 5 depicts the different phases of the multi-vendor approach of the system. In a first phase (501), the orchestration engine may configure individual features in a target device. The orchestration engine may have an object-based approach of each feature (each feature comprises of objects created from the NDK). The second phase (502) may be to support features on multiple vendors. Each orchestration is happening for a given vendor, operating/configuring vendor-specific features). The third phase (503), as network function virtualization is becoming available where a single device can operate several 3rd party operating systems, the system may be available to enable these features for any NFV device, for instance a Cisco NFV appliance running a Cisco CSR virtual router with a Riverbed Steelhead virtual appliance and a Palo Alto virtual firewall. FIG. 6 shows an example of how a vendor may be swapped (e.g., vendor B (601) to vendor A (602)) for a device. The network model may remain consistent among customer (610), region (620), hub (630), and device (640) nodes, but as one device (640) is swapped out for another device (640) of the same type but made by a different vendor, the model may be pre-equipped to modify the instructions for the device (640) to correspond to the correct syntax and semantics for that vendor (e.g., the correct language used by the device). As the NDK may contain a model of every atomic element used in a network model, if a concept exists across multiple vendors, a common network model may be designed for the engine to deliver that unified model across all the vendors.

The DSPE may be purpose built to utilize best practice object-modeling methodologies today and to utilize new models in the future. The DSPE may ingest device specific protocol connectors (DSPCs), which may be objects that represent the model of any specific device, physical and/or virtual. The device's command and control, and monitoring language, syntax, context, and parameters may be modeled utilizing industry standard languages and techniques such as current versions ECMA-262 (e.g., JavaScript, and ECMA-404 (JSON), specific annotations found in FLAW, and procedural script extensions to ECMA-404). The Gluware DSPE may utilize new languages, data types, communications and access techniques over time as they become available. Specific device DSPC's may be built by hand coding models based on available documentation on a specific device's interface for command and control, and monitoring language, syntax, context and parameters. DSPCs may also be built by an automated, self-learning process.

Figure 7:
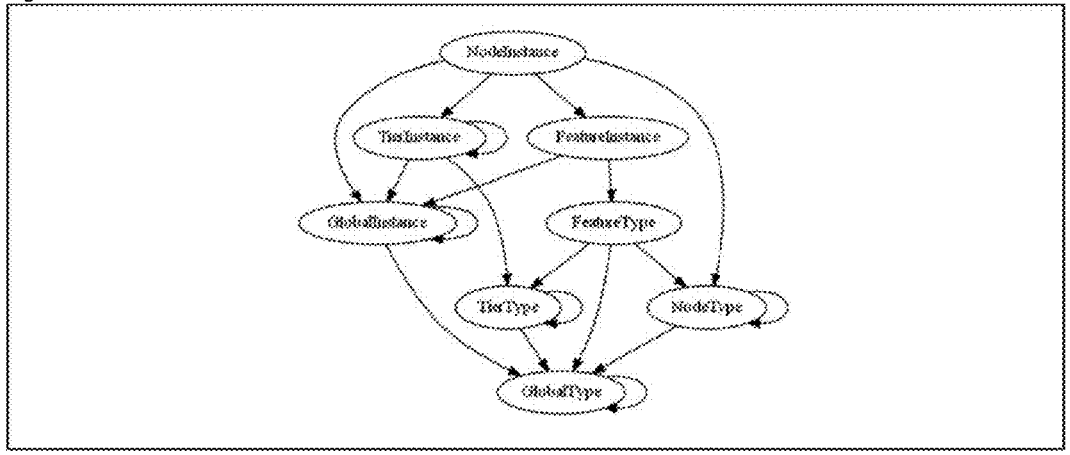
FIG. 7 is a set of dependencies and rules execution performed by an orchestration engine according to an embodiment of the invention.

FIG. 7 depicts a set of dependencies and rules execution performed by an orchestration engine according to an embodiment of the invention. Dependencies may flow as shown between NodeInstance, TierInstance, FeatureInstance, GlobalInstance, FeatureType, TierType, NodeType, and GlobalType elements. The arrows in FIG. 7 show possible relationships between the elements, such as how elements may refer to one another. For instance, a NodeInstance may refer to a FeatureInstance (indicated by the arrow pointing from NodeInstance to FeatureInstance), but a GlobalInstance may not refer to a NodeInstance (indicated by the fact that there is no arrow from GlobalInstance to NodeInstance). One or more of the following features may be considered in defining the dependencies and/or rules:

1. Global Network Parameterization:
   Entities may derive default configurations and parameters when serving the network infrastructure needs of organizations. For example, administrative domains, organizations and sub-organizations may institute global standard configurations of their network construct parameters (e.g., DNS servers, NTP server, and other common network infrastructure systems and services). Local organizations may override global settings and the global settings may need to be available as a default throughout the organization, for standard implementation, updates and changes.

2. Tiered Configuration Standards

Entities that provide networking services may organize their customers or themselves hierarchically, such as, for example, by: companies, continents, regions, business units (that may span across regions), network service groups (e.g., streaming video, real-time chat and collaboration applications, application path optimizing and performance routing domains).

3. Global and Local Policies

Policies may be groupings of network settings, router configurations and other parameters that may be implemented according to tiered configurations, as mentioned above. Policies may be applied to administrative domains, organizations and sub-organizations (e.g., entities), from initial implementations and throughout business and infrastructure need changes.

4. Device Feature Implementation Standards

Entities may wish to ensure that specific device configurations may be standardized across organizations and sub-organizations. When device manufacturing may require a change, the configuration and services may need to remain the same or similar, a multi-vendor aware infrastructure may be needed to seamlessly support standard implementations.

FIG. 14 depicts an example for declaring a feature dependency. The items (1401-1404) shown may illustrate example dependencies among model elements in code or pseudo-code. Each feature (1401) may depend on other features (1402) and domains (1403) and may only apply to a particular type of object (here a router) (1404).

In some embodiments, the platform may go beyond syntactical command line interface (CLI) models of specific networking devices to create models for command and control of networking devices. Following similar constructs, and rules and practices of object oriented programming, the modeling may define networking devices, structures, constructs and related concepts as objects. This modeling may consider how the objects are defined to relate to each other utilizing high level programming languages and data annotations to describe, for example: devices (e.g., physical and/or virtual network devices), policies, interdependencies, constraints, hierarchical structures of networks, network device interfaces, access control lists, route-maps, class-maps, or any command, control, and monitoring of objectified nodes, or any combination thereof. In some embodiments, network devices may be defined similar to object models in object oriented programming languages, such as, for example, following rules of class, inheritance subclass, and so on.

In some embodiments, objects may be communicated with well-defined interfaces. As with object oriented programming, classes of data and objects may enable definitions of subclasses via inheritance. Standard rules of object-oriented programming may be applied from new data type definitions to instantiation and reuse.

In some embodiments, the orchestration engine may include a synchronization engine to help ensure that the configurations, data, and state of target network devices match the information stored in the system database. If manual changes were performed on a network node and/or device that has been provisioned in the orchestration engine, the synchronization engine may examine and compare the information on the device and/or node with its represented information stored in the versioned repository. If the information does not match, a notification may be logged and messaged to a human operator. Either the human operator has defined a default behavior for the synchronization engine to act as soon as the information changes or the human operator will have to manually trigger the synchronization (in order to follow a particular maintenance window where changes are allowed). In both cases, the synchronization engine may use syntax and semantic checking while comparing the represented information in the model. The represented information that enforced one or several policies in place for that device may specify any additional action to take, such as, for example:

1. Revert back to configurations only specified by default or admin.
2. Update the information in the system to reflect the current device configuration.
3. If the local override criteria has been met, then update the information in the system to reflect the current device configuration, else, revert to the last version of the information stored in the system.

The system may not be required to provision all nodes on a network. Rather, it may be up to the IT staff to determine which devices and/or portions of their network they wish to provision and manage. For example, the provisioning may be migrated in or out of any network at any time, and at any rate.

Some embodiments may provide an integrated, network model builder, and orchestrating tool, enabling network engineers and IT staff to rapidly model, provision, configure, deploy, modify, monitor and perform complex network engineering and management functions—all from a visual user interface. The tool may utilize the objects, constructs, and data defined by IT staff.

Figure 17:
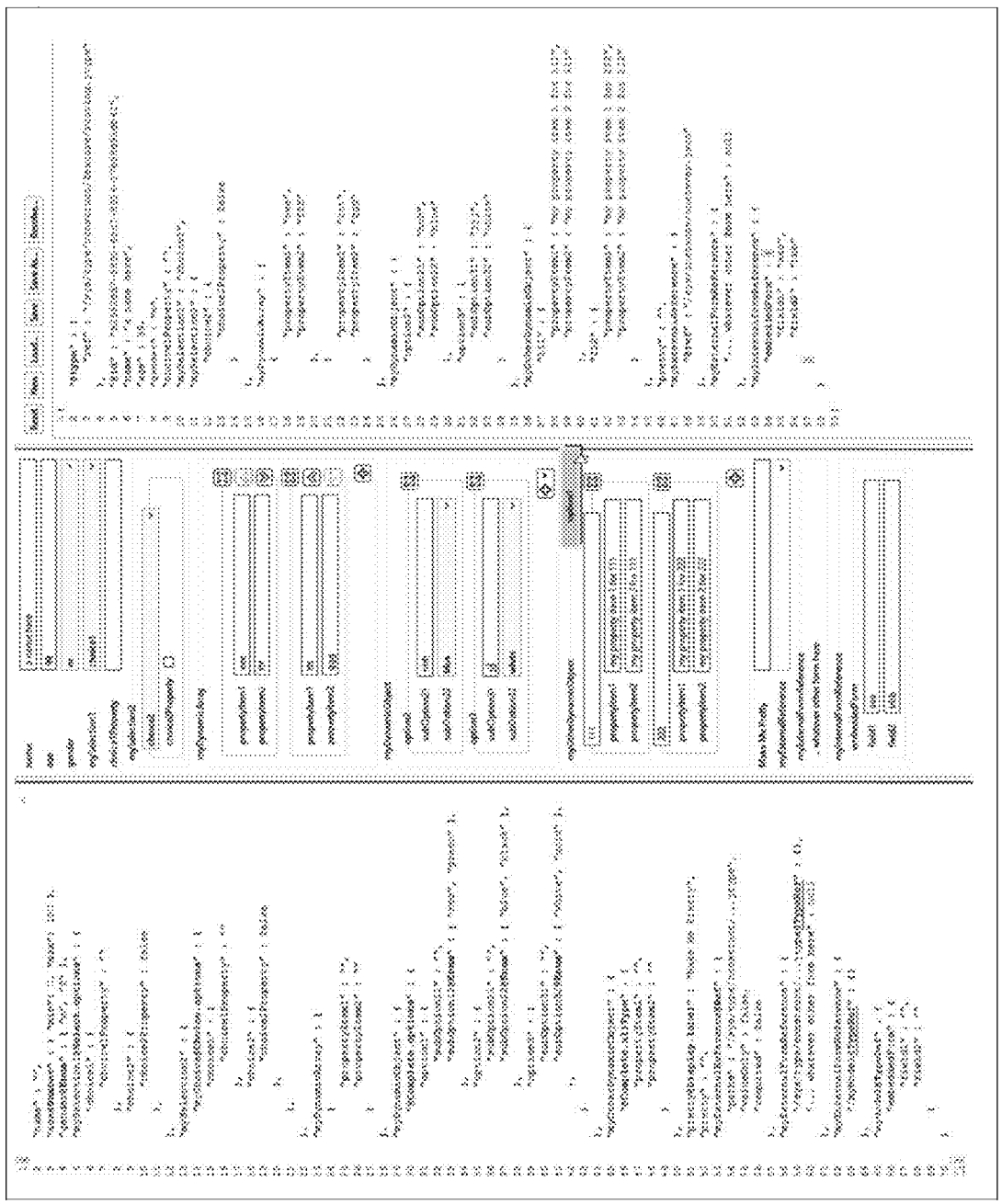
FIG. 17 is an example of modeling according to an embodiment of the invention.

FIG. 11 is an IDE that shows the three-pane approach to build a network model (of network concepts/objects), exercise/validate that network model, and use it straight away. The network model may include network concepts, which may be low level functions of a network device. For example, any device or object in the network model may include network concepts applicable to an equivalent real device or object on a real network, and the real device may execute the network concepts. Network concepts may include, for example, dynamic methods as described below. In some embodiments, the modeling builder as shown in FIG. 11 may use a network modeling language to allow the network engineer to create the model. There may be multiple modeling languages available. One example is known as YANG (RFCs 6020, 6022, 6991, 6087, 6095, 6110, 6241, 6243, 6470, 6536, 6643, 7223, 7224, 7277, 7317, 7407). YANG may require developer expertise in order to use it. Those skilled in the art will understand that YANG only allows the user to define a model. Then another system may be required to utilize the YANG model. In some embodiments, a modeling language called FLAW may be used. FLAW may allow for both the conception and the immediate use of the model. The interface of FIG. 11 may be divided into three panes: (1101) the left pane that contains the FLAW model in code (also known as the "jtype"); (1102) the middle pane that shows the model in UI elements (such as text boxes, buttons, dropdowns, tabs, scroll bars . . . ) to visually see and exercise the model with user data and; (1103) the right pane that shows the data captured by the model, ready to be stored or used for the automation platform. FLAW may be based on JavaScript Object Notation (ECMA-404 JSON). FLAW may include some purpose built custom annotations that give data structure to the JSON. The may use the left pane (1101) to define the model using the FLAW language. Defining a model may cause the middle plane (1102) to render a graphical representation of the model. As a consequence, the user may see a visual representation of the model submitted in the middle pane (1102). Then, by using the graphical representation in the middle plane (1102) (e.g., a form waiting for user inputs), the right pane (1103) may show the resulting JSON file with the user inputs captured. FIG. 17 depicts an example of FLOW modeling according to an embodiment of the invention. FLOW may comprise additions to specific notations to the JSON language. The FLOW model may be written on the left pane, where the rendering of the model appears in real-time in the middle pane in a shape of a form. That form may be exercised immediately, and all the user inputs from the form may be stored in the JSON filed displayed accordingly on the right pane. Lines 2, 3, and 4 of the left pane show example notations for primitives like strings (line 2), numbers (line 3), or arrays (line 4). These elements may appear rendered in the top middle pane, and putting values in the form like "a name here" or "99" may cause the JSON to store these values (lines 7-8 in the right pane). Line 5 of the left pane shows an example of selection of options (@Select.options) appearing as a dropdown menu as the user chooses from the choices. The resulting JSON output may appear in the right pane accordingly (Line 9 and 10 in the right pane). Lines 13-22 of the left pane show a variation of previous example (@Choice.options), where the middle pane may render a dropdown menu heading a section where the subform appears within. The resulting JSON may be shown in Lines 11-15 of the right pane. Lines 23-28 of the left pane show an array of objects (using [ ] brackets) allowing the user to create any identical objects in an orderly fashion. The resulting JSON may be shown in Lines 16-25 of the right pane. Lines 29-44 of the left pane show how to offer to the user a list of possible options (@Complete.options), wherein each option may lead to a specific subform to be displayed. The resulting JSON may be shown in Lines 26-35 of the right pane. Lines 45-50 of the left pane show a collection of objects where each object may be given a name. Each object may display a subform that can be given any values. The resulting JSON may be shown in Lines 36-45 in the right pane. Lines 51-52 of the left pane show that it may be possible to control the cosmetic of the rendering showed to the user in the middle pane. The property may be given a label or a tab using notation @Display.label or @Display.tab. Other cosmetic controls may be available, such as controlling the tooltips or label of the icons in the rendered middle pane. Lines 53-57 of the left pane show the possibility to refer (@Ref) to other user data files (JSON) allowing a FLOW model to nest different level of data. The resulting link to the selected JSON file may be shown in Line 48 of the right pane. The user may visualize at any time the resulting JSON output for the entire model by pressing the Resolve button. Any referenced JSON file may be resolved, meaning that the content of it may be shown. Within a reference, it may be possible to specify if a reference is a relationship or not. The user may also have the ability to make a reference mandatory or not. When building models and forms, created forms made using a library of existing forms (either within the same FLOW model, to avoid repeating forms, or using external FLOW models) may be available. The two notations @TypeDef and @TypeRef may allow that possibility to the FLAW language as shown in Lines 53-70 in the left pane.

Figure 12:
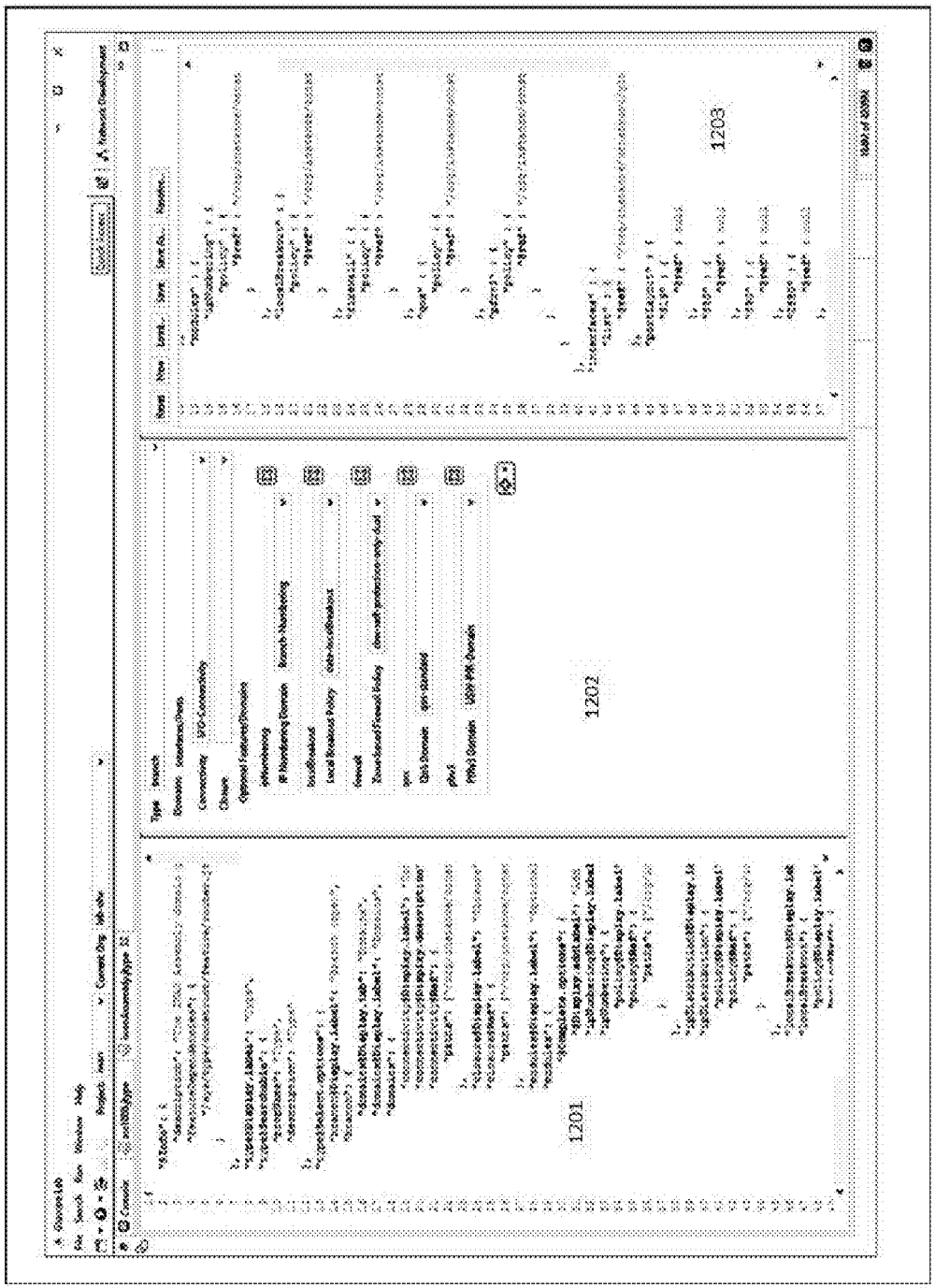
FIG. 12 is an interface for modeling a target device as a set of functional objects according to an embodiment of the invention.

FIG. 12 depicts an example of service chaining, demonstrating the ability to model a target device as a set of functional objects (in this case, network features). FIG. 12 shows how a FLAW model can be exercised immediately. The left pane (1201) shows the FLOW model, the middle pane (1202) shows the UI dynamically generated from the FLOW model and the right pane (1203) shows the resulting configuration data once user input in capture in the UI form.

Figure 16:
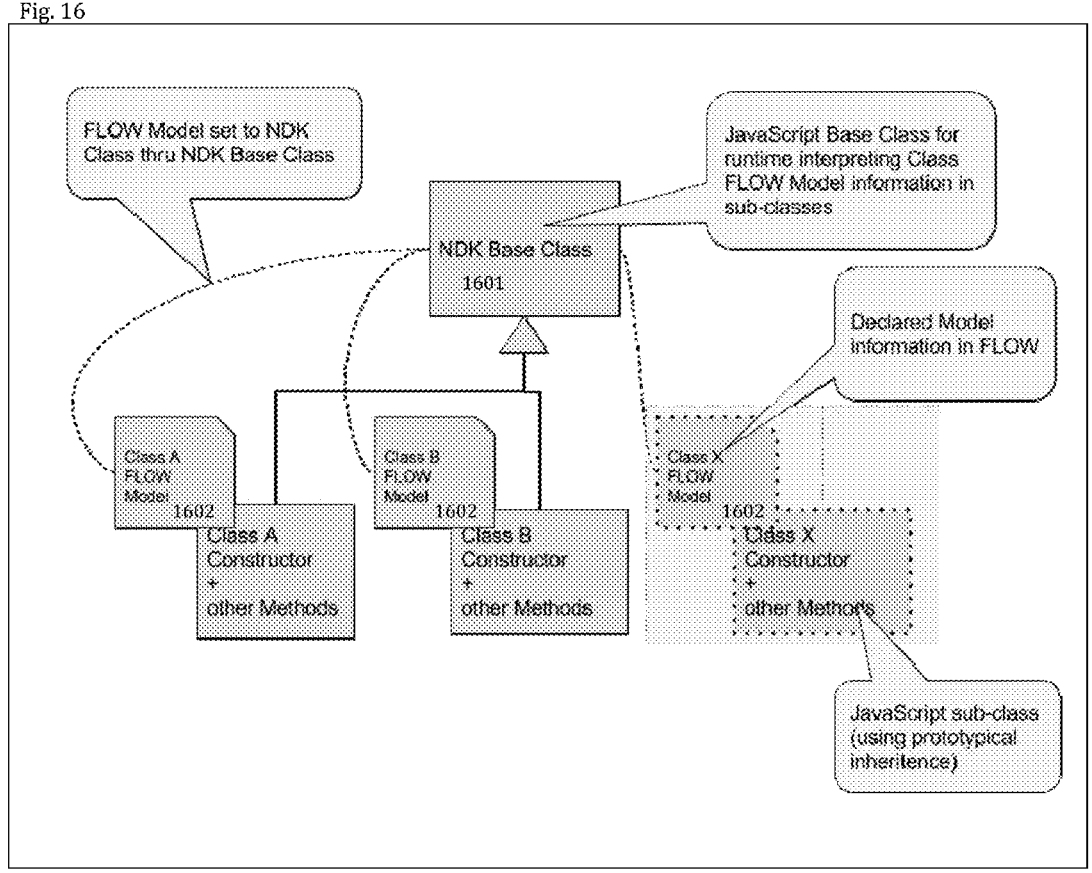
FIG. 16 is a set of class relationships according to an embodiment of the invention.

FIG. 16 shows a dynamic NDK base class (1601) and its relationship to the JavaScript classes (1602) that extend it according to an embodiment of the invention. The NDK base class may be regarded as the common trunk used to create (also called extending) all the other classes. Any number of NDK classes with their corresponding FLOW model may extend the dynamic NDK base class. The FLOW model may be in a JavaScript Object format or other suitable format, for example. The FLOW model may comprise the data the user of the dynamic NDK class enters to describe structured data properties of the NDK class the user also creates. The FLOW model may capture property names, nested property names, property basic types (string, number, boolean), property complex types (Object, Array), property value constraints (min values, max values, string patterns, etc.), and synthetic method annotation controls, for example.

The dynamic NDK may create dynamic methods on the NDK class that extends it from the FLOW model called synthetic methods. These synthetic methods may only exist at runtime. They may be created from type methods defined to the dynamic NDK class. The synthetic methods may be created from the information in the FLOW model. There may be methods on the dynamic NDK that give the user visibility to the synthetic methods at runtime. The NDK class that extends the dynamic NDK base class may also add new methods that override or extend the synthetic methods as well as the methods of the dynamic NDK class.

FLOW may be used for, for instance, defining data models, network models, data validation, UI forms, user interaction, etc.

Figure 10:
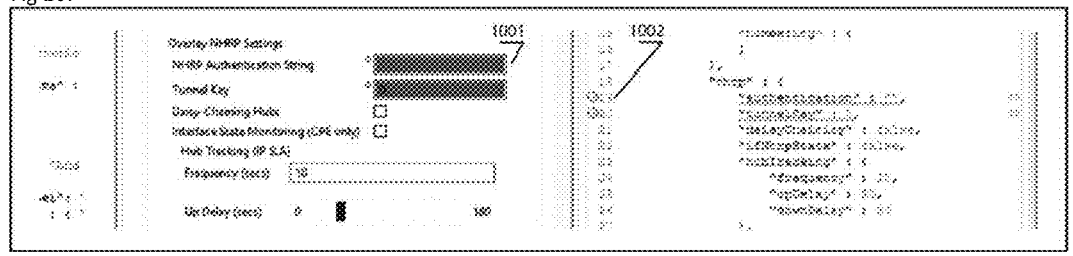
FIG. 10 is an example of validation of user input according to an embodiment of the invention.

In some embodiments, the networking development kit (NDK) may be a purpose built software development kit (SDK) for modeling and interacting with networking environments, along with a purpose built integrated development environment (IDE). Network equipment providers, network engineers, programmers, and IT staff may use this kit to rapidly and easily model their devices and networks. The kit may include built-in intelligence that may guide users on valid methods, properties, syntax, usage, and/or valid data ranges for the interaction of network model constructs. For example, FIG. 10 shows the built-in validation within FLAW for user inputs according to an embodiment of the invention. When the user does not enter the correct value, the UI may visually indicate when an entry is not valid in both the visual representation of the model (1001) and the JSON containing the user inputs (1002).

Utilizing the NDK, explained below, in conjunction with popular object oriented IDEs, such as Eclipse™, IntelliJ™, Komodo™, XCode™ and others, IT staff and developers may build object-oriented objects and intelligence for execution and orchestration.

The NDK may include a library of classes (in the sense of object-oriented programming) modeling objects that are known to those skilled in networking such as an access-list, a route-map, an interface, a border gateway protocol (BGP) neighbor, etc. Each of these objects may include constructs such as, but not limited to, a constructor with or without arguments, methods, and system methods. A portion of these constructs may be dynamically created. This will be described below. The constructor construct may include all the properties required to model the object such as, but not limited to, the name or the version. For instance, if the object is a network switch, properties can be the number of ports, the capacity of the backplane, the operating type (is it a layer-2 switch or layer-3/routing switch?). These properties can be of the following types, but are not limited to, primitives (such as, but not limited to, strings, booleans, numbers, arrays of numbers, array of strings . . . ), objects (such as, objects created with classes within the NDK or not), arrays of objects (within the NDK or not), or objects of objects (within the NDK or not). In the interest of consistency throughout the NDK library, each type of property may have a set of synthetic methods. Some synthetic methods are, but not limited to:

Primitives
  set (value1, value2 . . . ): sets the object properties to the values submitted
  unset ( ): unsets the values from the object properties
  get ( ): retrieved the value of a given object property
Objects
  link ( ): assigns another object (reference or object itself) to the object property
  unlink ( ): un-assigns the object reference or object stored off the object property
  get ( ): retrieves the object reference or object attached to the object property
Array of Objects or Object/Collection of Objects
  add ( ): adds another object (reference or object itself) to the object property (that property acting as an array of objects or collection of objects)
  remove ( ): removes any selected object (reference or object itself) to the object property (that property acting as an array of objects or collection of objects)

For instance, if access-list and interface objects are respectively modeled in an NDK classes called IpAcl and Intf and can be a property within the Intf class called "filterOut", this property "filterOut" may contain a reference to an IpAcl object. So the three synthetic methods available are linkFilterOut( ), unlinkFilterOut( ), getFilterOut( ). As this might be difficult to understand the purpose of a given synthetic method, a renaming mechanism may be included to assign an alias name to a given method. For instance, linkFilterOut( ) may be renamed as linkFilteringOutbound( ).

There may also be other methods called system methods that can be found in any each class. The system methods may include, but are not limited to:

getName( ): retrieves the name of the object (for instance: myObject)
getNamespace( ): retrieves the name of the class (for instance: IpAcl)
toString( ): retrieves the name of the object appended with the name of the class (for instance: myObject [IpAcl])
validate( ): returns true or false whether the object is valid according to the FLAW model. Before any property is assigned with an object reference (as a direct reference or an addition to an array or a collection), the NDK will always validate the object to make sure it matches the FLAW model.
gene rateCli( ): returns the command line interface (CLI) for a given object (if that is the way to communicate with the target device)
generateCalls( ): returns all the relevant calls (REST, SOAP . . . ) for a given object (if that is the way to communicate with the target device).

That consistency across the NDK, by having synthetic and system methods, may allow for the utilization of programming macros. Those skilled in the art may use macros to avoid repeating the same code over and over and automatically generate all the required code in a library efficiently without errors. This technique is known as programming scaffolding, where pre-defined code templates are used to generate the final code of an application or a library that would end up in a persistent storage (such as a computer hard drive). If some or not all the NDK class libraries may be generated using that kind of scaffolding technique, one embodiment of this invention may take this automation to the next level where there is no need of generating code, as the NDK may contain a module (called dynamic NDK or dyNDK) that intercepts all the calls to the synthetic or system methods and dynamically executes the template code accordingly. This may speed up the elaboration of new classes, the altering of existing classes, and the execution time while removing the need for maintaining the NDK library to keep it up to date (by running the scaffolding automation each time an update/upgrade is required).

Each class in the NDK may be described using FLAW. This may make the generation of NDK classes extremely fast. FIG. 15A is an example of how to use the NDK according to an embodiment of the invention. Each class of object may be defined using the FLAW language. The dynamic NDK may intercept all the calls intended to the object properties. In this example, the dynamic NDK may intercept calls such as setAge( ), unsetAge( ), getAge( ), linkObj1( ), unlinkObj1( ), getObj1( ), addObj2( ), removeObj2( ), addList1( ), removeList2( ), getName( ), getNamespace( ), validate ( ), toString ( ) . . . etc. Some other methods like bar ( ) may also be added to enrich the class with other more specific methods. This example only relies on the class definition as shown in FIG. 15A. FIG. 15B is an example of the dynamic NDK being used for a class definition shown in FIG. 15A.

Each vendor may have their specific way of implementing their solution. Each solution may comprise a standard or vendor specific concept or element. Those skilled in the art see an access-list as a standard concept among many vendors for filtering where a performance routing domain (PfR) is a Cisco Systems specific path control concept. So the dynamic NDK may make modeling of these concepts very quick and easy. Only a class definition may be required for the NDK class modeling an access-list where a vendor specific NDK class may be required to model Cisco Systems PfR, for example.

Networks may be modeled using constructs that reflect complex details and relationships between network constructs and each other. For example, a construct may be a network node, which may be a representation of a physical or virtual device in a network, such as a router or a switch.

Domains may offer a basis to describe common related configuration settings across a group of Nodes. For example, in order to portray a geographical relationship between nodes, a "region" domain may be created with configuration settings that describe a particular geographical relationship (e.g., a DNS server). Instances of this region domain can then be created for specific geographical locations (e.g. Europe, Asia, Americas). When nodes are deployed into the system they can be attached to the region instances, effectively inferring, "this node is part of the Europe Region".

When using a region domain, the relationships may be defined in a sentence with the transitive phrases such as "belongs to" or "is part of".

A domain construct may also describe the hierarchical relationship between domains. For example, a region domain may have a parent relationship to a customer domain and a child relationship to a network domain. This portion of the model may convey that customers have regions, and these regions have networks. With the dependency order established in this relationship, the model may yield the knowledge that when a node is attached to a specific network domain, it is then implied to be part of that network's region domains, and that region's customer domains. The hierarchical nature of domains may be complex as a result of the parent/child relationships, so their definition may also include a cardinality which may be one to one, one to many, or even many to many. Using the example above, if we only designed a region to be part of one customer, we could define many regions to one customer parent relationship; therefore, implying the customer's child relationship (e.g., one customer may have many regions). In some embodiment, multiple networks may be part of multiple regions, and many networks to many regions parent relationship may be defined.

Figure 8A:
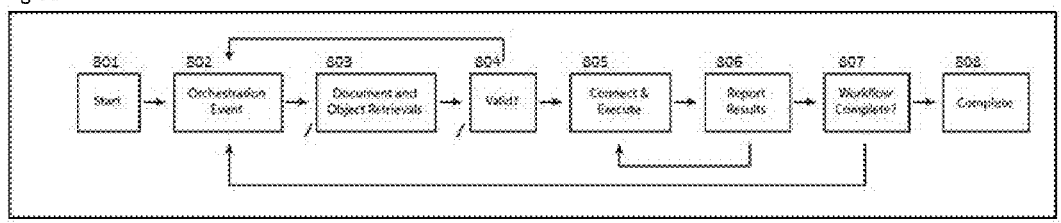
FIG. 8A is an orchestration workflow according to an embodiment of the invention.
Figure 13:
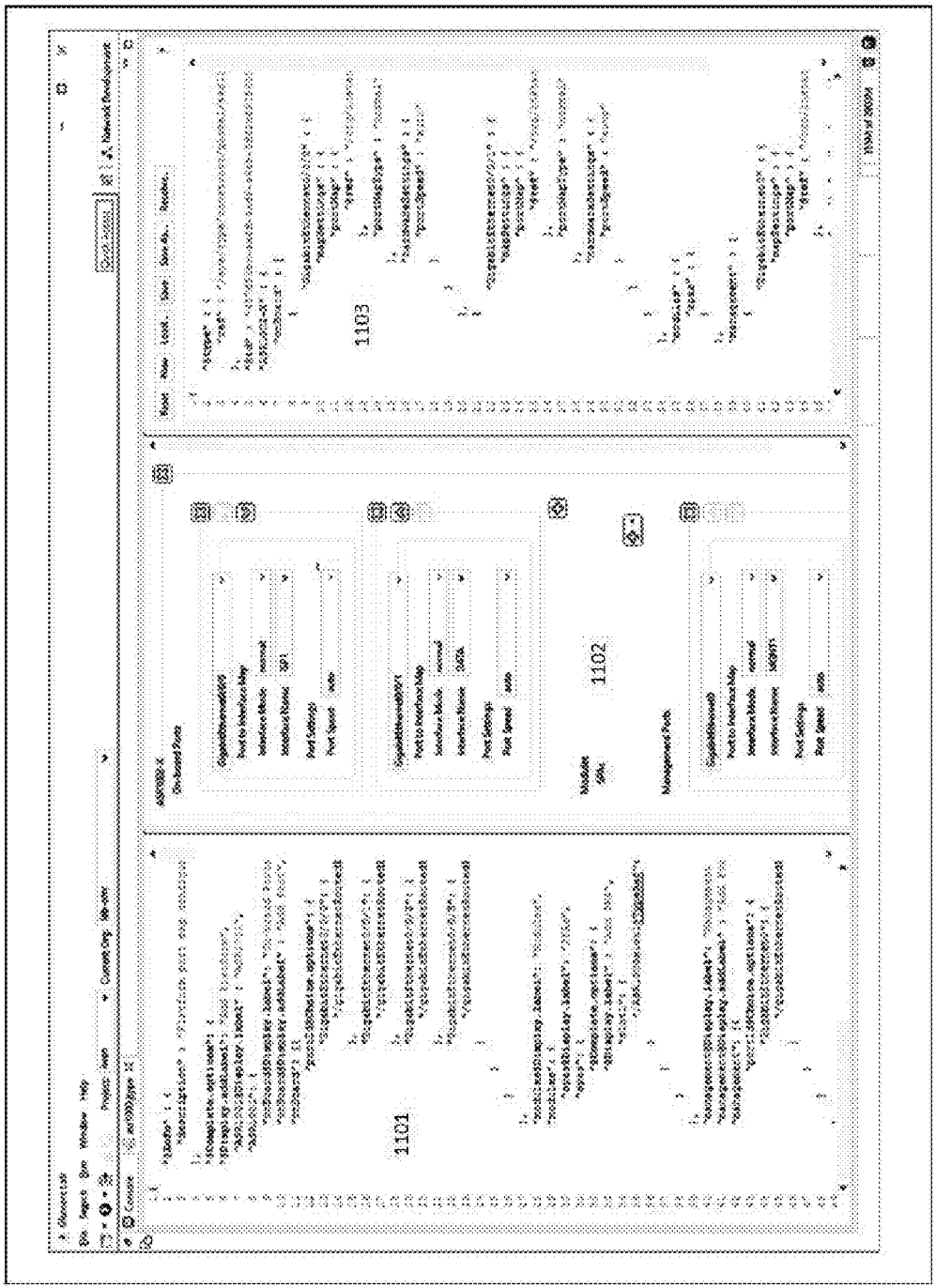
FIG. 13 is an example orchestration engine output according to an embodiment of the invention.

FIG. 8A depicts a simple generic orchestration workflow (801). Once the classes in the NDK are conceived (e.g., FIGS. 15a, 16), once the nodes, features, domains, and all other constructs are created (e.g., FIGS. 11, 12) and their dependencies clearly specified (e.g., FIG. 14), the orchestration may take place and the model may be applied to the target node. An orchestration event may take place (802), causing document and/or object retrievals (803). If a validity check passes (804), a connection/execution may proceed (805). Results may be reported (806). If the workflow is complete (807), the workflow may end (808). This workflow does not represent any specific hardware functionality, but is merely used as an example to illustrate the feature package of FIG. 8B. An example of an orchestration log is shown in FIG. 13. FIG. 13 shows an output of the orchestration engine. This figure shows the inner processing of the engine using models (1302) and objects (1301), for example.

Figure 8B:
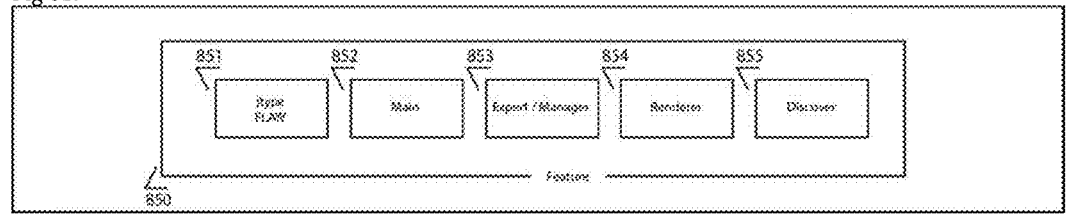
FIG. 8B is a feature package according to an embodiment of the invention.

FIG. 8B depicts a network feature in a single feature package (850). The package may contain the jtype with describes the feature model in FLAW language, the expert/manager section that builds the feature using NDK objects (such as IpAcl, Intf, RouteMap, ClassMap, BgpNeighbor . . . ), the rendering section that translates the objects into the target language or calls and the discovery section that understands the objects already configured in the target device (e.g., to compare what needs to be added/removed/changed/altered/modified).

A network feature may use the modeled concepts or elements in the NDK. A feature may be divided into four sections: a main section (851), an expert or manager section (852), a discovery section (853), and a rendering section (854). The manager may be a collection of objects that are created and assembled together in order to model the network functionality. Any object created within a manager may be stored in a dynamic in-memory repository in order for the rendering section to know what needs to be rendered. Rendering may include converting the objects into a language that the target device understands (CLI commands, REST calls, etc.). The rendering may be relevant if there is discovery section that allows the engine to engage with the target device and to know what has already been configured and/or what is badly configured or missing. In one embodiment, there may be no specific treatment whether this is the first time the engine engages with a device or not. If it is the first time, it means there is nothing in the device configuration and it may need to be fully rendered. If these are subsequent accesses to the device, the configuration may be checked and updated accordingly. The engine may have the full understanding of the syntax and semantic for each object modeled of the target language, as this may be stored in the NDK as part of the modeling of the vendor specific concepts or elements. The main section of the feature may "glue" the other sections together, allowing the engine to know in which order to process the feature, as some elements may need to be processed in a specific order.

Figure 9:
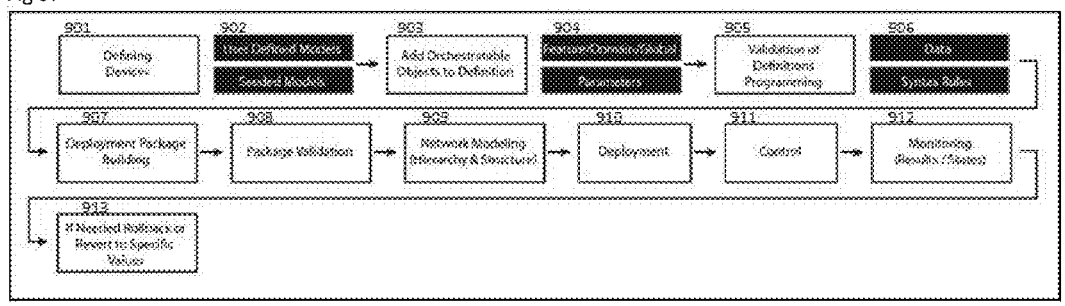
FIG. 9 is a feature creation process according to an embodiment of the invention.

FIG. 9 is a feature creation process according to an embodiment of the invention. Devices may be defined (901) (including via user defined models and/or seeded models (902)). Defining may be performed within the visual tool (e.g., FIGS. 9-12) and/or based on information in the library (420) of FIG. 4. Orchestratable objects may be added to the definition (903) (including feature/domain/global elements and other parameters (904)). The definitions may be validated (905) according to their internal data and extrinsic system rules (906) (e.g., by control processor (430) of FIG. 4). The deployment package may be built (907) and validated (908) (e.g., by control processor (430) of FIG. 4). Network modeling may be performed (909) (e.g., by lab/development processor (410) of FIG. 4). The package may be deployed (910) (e.g., by orchestration processor (440) of FIG. 4) and may control the device (911). The control may be monitored (912) and, if needed, device control may be rolled back or reported (913) (e.g., by orchestration processor (440) of FIG. 4).

When several features need to be processed in order to send the full configuration to a device, a module within the engine may find and manage the dependencies between the features and domains used in the configuration. This module is called the feature runtime engine (FRE). Each feature may be registered with the FRE using the FLOW language to model the specifics of the feature such as, but not limited to, dependencies with other features and domains. The feature models may be resolved and understood at runtime by the FRE that will execute the features in the correct order. The FRE may manage the addition, the maintenance, the update, and the removal of features on the target device.

While various embodiments have been described above, it should be understood that they have been presented by way of example and not limitation. It will be apparent to persons skilled in the relevant arts that various changes in form and detail can be made therein without departing from the spirit and scope. In fact, after reading the above description, it will be apparent to one skilled in the relevant arts how to implement alternative embodiments. For example, various applications of the systems and methods described herein may include exchange of financial information; managing rewards points; storing and exchanging transaction-specific payment tokens; facilitating remittance services; reconciling accounts across disparate entities (e.g., subsidiaries and/or partners); consolidating discrete business unit or private ledgers; replacing legacy core settlement systems; transferring health care information; and/or other applications.

In addition, it should be understood that any figures that highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims, and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method comprising:
   performing processing associated with abstracting, with at least one development module in communication with at least one processor and at least one memory, at least one definition of at least one network model comprising at least one of a plurality of classes, the abstracting being performed using an object oriented network development kit (NDK),
      the object oriented NDK creating models for command and management of network device configuration and allowing execution of at least one task comprising at least one action associated with: deployment, setup, provisioning, re-provisioning, un-provisioning, configuring, re-configuring, un-configuring, rolling-forward, rolling-back, reverting controlling, monitoring, operating, synchronizing, orchestrating, or instrumenting, or any combination thereof;
      each class comprising at least one property defining at least one network concept for at least one network device in a network of devices,
      wherein abstracting the at least one definition of the at least one model comprises modeling at least one device's management plane, control plane, configuration state, features, functions, properties, attributes, or a combination thereof;
   performing processing associated with generating, with at least one control module in communication with the at least one processor and the at least one memory, the at least one network concept from the at least one network model;
   performing processing associated with analyzing, with the at least one control module, the at least one definition of the at least one network model to identify at least one task in at least one hierarchy of an object-oriented modeling scheme and at least one node of at least one network;
   performing processing associated with creating, with the at least one control module, at least one connection between the at least one orchestration engine and the at least one node;
   performing processing associated with creating, with the at least one control module, at least one instruction for the at least one node, the instruction being formulated to complete the at least one task; and
   performing processing associated with transmitting, with at least one orchestration module in communication with the at least one processor and the at least one memory, the at least one network concept to the at least one network device corresponding to the at least one class in the at least one network model.

2. The method of claim 1, further comprising performing processing associated with providing, with the at least one development module, a library comprising the plurality of classes.

3. The method of claim 1, wherein each class comprises syntax data and semantic data.

4. The method of claim 1, wherein each class comprises data applicable to a plurality of network elements each operating using one of a plurality of languages.

5. The method of claim 1, wherein the at least one definition of the at least one network model comprises at least one device definition, at least one feature, at least one function, at least one parameter, at least one annotation, at least one rule, at least one package code element, at least one hierarchy, at least one action, at least one construct, at least one domain, or at least one dependency, or a combination thereof.

6. The method of claim 1, further comprising:
   performing processing associated with sending, with the at least one orchestration module, the at least one instruction to the at least one node; and
   performing processing associated with determining, with the at least one orchestration module, whether the at least one task has been completed by the at least one node in response to the at least one node receiving the at least one instruction.

7. The method of claim 1, wherein the at least one node comprises at least one physical device, at least one virtual device, at least one device enabled for object-oriented interaction, at least one device enabled for representational state transfer application program interface interaction, or at least one device enabled for document object model interaction, or a combination thereof.

8. The method of claim 1, further comprising performing processing associated with validating, with the at least one control module, the at least one definition of the at least one model.

9. The method of claim 8, wherein performing processing associated with validating, with the at least one control module, the at least one definition of the at least one model comprises performing processing associated with detecting at least one error, or performing processing associated with reporting at least one validation result, or a combination thereof.

10. The method of claim 8, wherein the performing processing associated with validating, with the at least one control module, the at least one definition of the at least one model comprises performing processing associated with validating at least one simulated configuration for at least one node.

11. The method of claim 1, further comprising performing processing associated with providing, with the at least one development module, at least one visual development tool.

12. The method of claim 11, wherein the abstracting is performed in response to performing processing associated with receiving, via the at least one visual development tool, at least one user command.

13. The method of claim 1, wherein the development module comprises an integrated development environment (IDE).

14. The method of claim 1, wherein abstracting the at least one definition of the at least one model comprises ingesting device specific protocol connectors.

15. The method of claim 1, wherein the at least one network concept comprises a low level function of the at least one device.

16. A system comprising:
   at least one processor;
   at least one memory;
   at least one development module in communication with at least one processor and at least one memory, the at least one development module being configured to perform processing associated with abstracting at least one definition of at least one network model comprising at least one of a plurality of classes, the abstracting being performed using an object oriented network development kit (NDK), the object oriented NDK creating models for command and management of network device configuration and allowing execution of at least one task comprising at least one action associated with: deployment, setup, provisioning, re-provisioning, un-provisioning, configuring, re-configuring, un-configuring, rolling-forward, rolling-back, reverting controlling, monitoring, operating, synchronizing, orchestrating, or instrumenting, or any combination thereof;

each class comprising at least one property and at least one method defining at least one network concept for at least one network device in a network of devices, wherein abstracting the at least one definition of the at least one model comprises modeling at least one device's management plane, control plane, configuration state, features, functions, properties, attributes, or a combination thereof;

at least one control module in communication with the at least one processor and the at least one memory, the at least one control module being configured to:

perform processing associated with generating the at least one network concept from the at least one network model;

perform processing associated with analyzing the at least one definition of the at least one network model to identify at least one task in at least one hierarchy of an object-oriented modeling scheme and at least one node of at least one network;

perform processing associated with creating at least one connection between the at least one orchestration engine and the at least one node; and perform processing associated with creating at least one instruction for the at least one node, the instruction being formulated to complete the at least one task; and at least one orchestration module in communication with the at least one processor and the at least one memory, the at least one orchestration module being configured to perform processing associated with transmitting the at least one network concept to the at least one network device corresponding to the at least one class in the at least one network model.

17. The system of claim 16, wherein the at least one lab module is further configured to perform processing associated with providing a library comprising the plurality of classes.

18. The system of claim 16, wherein each class comprises syntax data and semantic data.

19. The system of claim 16, wherein each class comprises data applicable to a plurality of network elements each operating using one of a plurality of languages.

20. The system of claim 16, wherein the at least one definition of the at least one network model comprises at least one device definition, at least one feature, at least one function, at least one parameter, at least one annotation, at least one rule, at least one package code element, at least one hierarchy, at least one action, at least one construct, at least one domain, or at least one dependency, or a combination thereof.

21. The system of claim 16, wherein the at least one orchestration module is further configured to:

perform processing associated with sending the at least one instruction to the at least one node; and perform processing associated with determining whether the at least one task has been completed by the at least one node in response to the at least one node receiving the at least one instruction.

22. The system of claim 16, wherein the at least one node comprises at least one physical device, at least one virtual device, at least one device enabled for object-oriented interaction, at least one device enabled for representational state transfer application program interface interaction, or at least one device enabled for document object model interaction, or a combination thereof.

23. The system of claim 16, wherein the at least one orchestration module is further configured to perform processing associated with validating the at least one definition of the at least one model.

24. The system of claim 23, wherein the at least one control module is configured to perform processing associated with validating the at least one definition of the at least one model by performing processing associated with detecting at least one error, or performing processing associated with reporting at least one validation result, or a combination thereof.

25. The system of claim 23, wherein the at least one control module is further configured to perform processing associated with validating the at least one definition of the at least one model by performing processing associated with validating at least one simulated configuration for at least one node.

26. The system of claim 16, wherein the at least one development module is further configured to perform processing associated with providing at least one visual development tool.

27. The system of claim 26, wherein the abstracting is performed in response to performing processing associated with receiving, via the at least one visual development tool, at least one user command.

28. The system of claim 16, wherein the development module comprises an integrated development environment (IDE).

29. The system of claim 16, wherein abstracting the at least one definition of the at least one model comprises ingesting device specific protocol connectors.

30. The system of claim 16, wherein the at least one network concept comprises a low level function of the at least one device.

* * * * *